United States Patent
Profumo et al.

(10) Patent No.: US 12,049,946 B2
(45) Date of Patent: *Jul. 30, 2024

(54) HYDROMECHANICAL TRANSMISSION AND CONTROL METHOD

(71) Applicant: DANA ITALIA S.R.L., Arco (IT)

(72) Inventors: Giovanni Profumo, Arco (IT); Lorenzo Dalla Palma, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,298

(22) Filed: Oct. 5, 2022

(65) Prior Publication Data

US 2023/0065011 A1     Mar. 2, 2023

Related U.S. Application Data

(63) Continuation of application No. 17/445,818, filed on Aug. 24, 2021, now Pat. No. 11,493,119.

(51) Int. Cl.
F16H 47/04     (2006.01)
F16H 61/04     (2006.01)

(52) U.S. Cl.
CPC ......... F16H 47/04 (2013.01); F16H 61/0403 (2013.01); *F16H 2200/0034* (2013.01); *F16H 2200/2007* (2013.01); *F16H 2200/2038* (2013.01)

(58) Field of Classification Search
CPC .............. F16H 47/04; F16H 61/0403; F16H 2200/0034; F16H 2200/2007; F16H 2200/2038
USPC .......................................................... 475/72
See application file for complete search history.

(56) References Cited

U.S. PATENT DOCUMENTS

| | | | |
|---|---|---|---|
| 4,997,412 A | 3/1991 | Reed | |
| 6,761,658 B1 | 7/2004 | Stettler, Jr. | |
| 7,357,744 B2 | 4/2008 | Dyck et al. | |
| 7,530,914 B2 | 5/2009 | Fabry et al. | |
| 7,588,509 B1 | 9/2009 | Marsha | |
| 8,328,676 B2 | 12/2012 | Legner | |
| 2006/0276291 A1* | 12/2006 | Fabry | F16H 47/04 475/72 |
| 2008/0085801 A1* | 4/2008 | Sedoni | F16H 47/04 475/72 |
| 2011/0015022 A1 | 1/2011 | Stoeckl et al. | |
| 2013/0015022 A1 | 1/2013 | Sonnenmoser et al. | |
| 2015/0184726 A1* | 7/2015 | Rekow | F16H 47/08 475/5 |

(Continued)

FOREIGN PATENT DOCUMENTS

| | | |
|---|---|---|
| DE | 10122823 B4 | 3/2011 |
| EP | 3168498 A1 | 5/2017 |

*Primary Examiner* — Colby M Hansen
(74) *Attorney, Agent, or Firm* — McCoy Russell LLP

(57) ABSTRACT

Methods and systems for a hydromechanical transmission are provided herein. In one example, the transmission system includes a hydrostatic assembly and a mechanical assembly coupled in parallel to a first and second planetary gear sets. The transmission system further includes a plurality of clutches designed to shift between two drive ranges in a set of drive ranges that includes a reverse drive range and two forward drive ranges to adjust the input to output speed ratio of the transmission.

19 Claims, 9 Drawing Sheets

(56) References Cited

U.S. PATENT DOCUMENTS

2015/0299984 A1    10/2015   Mattsson et al.
2020/0200266 A1     6/2020   Peng et al.

\* cited by examiner

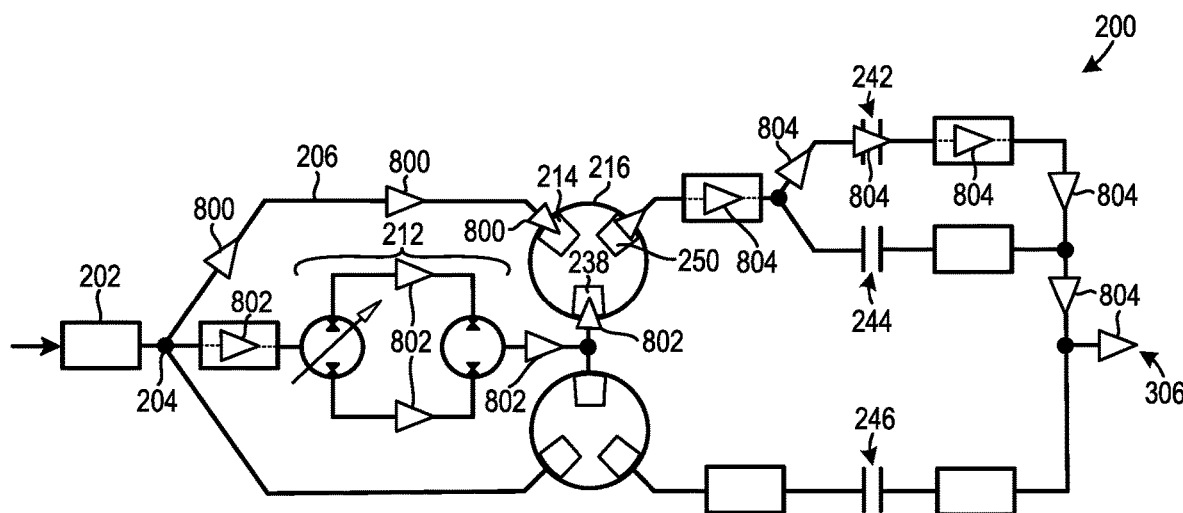
FIG. 8
|  | Reverse Drive Range | First Forward Drive Range | Second Forward Drive Range |
|---|---|---|---|
| Clutch (242) | Engaged | Disengaged | Disengaged |
| Clutch (244) | Disengaged | Engaged | Disengaged |
| Clutch (246) | Disengaged | Disengaged | Engaged |
FIG. 9
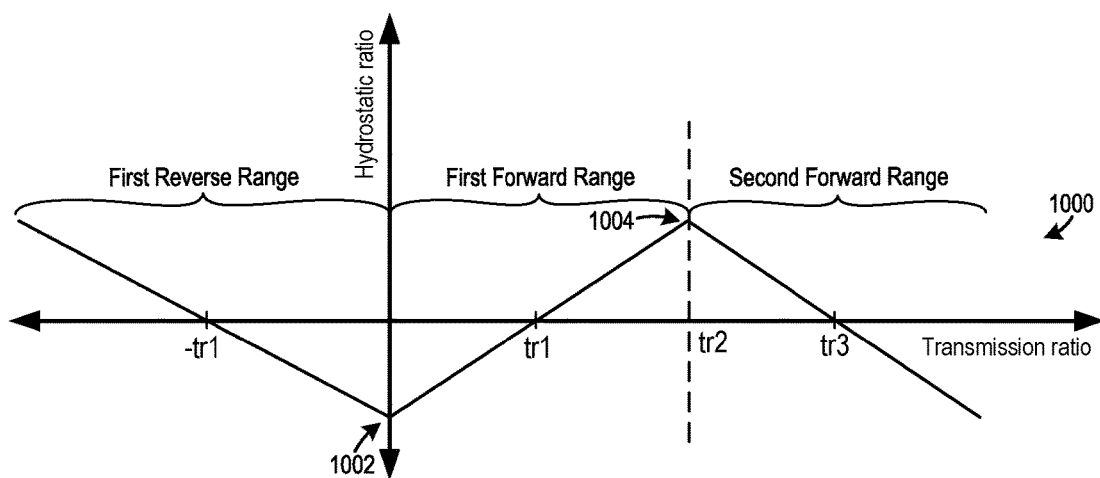
FIG. 10

HYDROMECHANICAL TRANSMISSION AND CONTROL METHOD

CROSS REFERENCE TO RELATED APPLICATION

The present application is a continuation of U.S. Non-Provisional patent application Ser. No. 17/445,818, entitled "HYDROMECHANICAL TRANSMISSION AND CONTROL METHOD", and filed on Aug. 24, 2021. The entire contents of the above-listed application are hereby incorporated by reference for all purposes.

TECHNICAL FIELD

The present disclosure relates to a hydromechanical transmission and a method for adjusting transmission drive range.

BACKGROUND AND SUMMARY

Hydromechanical transmissions enable performance characteristics (e.g., efficiency, shift quality, drive characteristics, control response, and the like) from mechanical and hydrostatic transmissions to be blended to meet certain design objectives. Certain hydromechanical transmissions, referred to in the art as hydromechanical variable transmissions (HVTs), provide continuously variable gear ratios. Hydromechanical transmissions may be particularly desirable due to their efficiency and power take off (PTO) capabilities. Vehicles used in industries such as agriculture, construction, mining, material handling, oil and gas, and the like have therefore made use of HVTs.

U.S. Pat. No. 7,530,914 B2 to Fabry et al. teaches a hydromechanical transmission with two synchronizers and two clutches. The synchronizing devices and clutches work in conjunction to shift the transmission between high and low speed ranges in both forward and reverse operating modes. In U.S. Pat. No. 7,530,914 B2, each clutch is paired with a synchronizing device on a common shaft. Further, each of the pairs of clutches and synchronizers are spaced away from one another due to the packaging constraints imposed by the transmission assembly.

The inventors have recognized several drawbacks with Fabry's transmission as well as other hydromechanical transmissions. Fabry's synchronizers, for example, may be susceptible to degradation, which generally decreases transmission reliability. Furthermore, the synchronizing devices increase system cost and complexity. Other hydromechanical transmissions have made unwanted tradeoffs with regard to transmission complexity, packaging efficiency, operational drive ranges, and shifting smoothness.

To resolve at least some of the abovementioned issues the inventors have developed a transmission system. The transmission system includes a hydrostatic assembly and a mechanical branch coupled in parallel using a first and second planetary gear sets. The system further includes a plurality of clutches that are coupled in parallel. The clutches include (i) a first clutch rotationally coupled to a carrier of the first planetary gear set, (ii) a second clutch rotationally coupled to the carrier, and (iii) a third clutch rotationally coupled to a ring gear of the second planetary gear set. The system further includes a controller configured to, responsive to receiving a shift command, operate the first, second, and/or third clutches to transition between two drive ranges in a group of drive ranges. The group of drive ranges includes at least one reverse drive range and two forward drive ranges. In this way, a compact clutch layout may be provided to smoothly shift between drive ranges. Consequently, power interruptions may be decreased (e.g., substantially avoided) during drive mode changes.

Further, in one example, the controller may be configured, in each of the drive ranges, to operate the hydrostatic assembly, to additively combine power from the hydrostatic assembly and the mechanical branch as well as recirculate power through the hydrostatic assembly to the mechanical branch during different stages in the drive ranges. In this way, power may be additively combined and recirculated depending on system operating conditions to increase transmission efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-8 are illustrations of the hydromechanical transmission system, depicted in FIG. 2, operating under different conditions in the system's drive ranges.

FIG. 9 is a chart indicating the configurations of the clutches in the different drive ranges.

FIG. 10 is an exemplary diagram of the hydrostatic ratio vs. the transmission ratio in the different drive ranges.

DETAILED DESCRIPTION

A hydromechanical transmission and method for operation of the transmission is provided herein. The hydromechanical transmission enables synchronous shifting to occur in a space efficient package. The transmission includes one reverse clutch and two forward clutches coupled in parallel to one another as well as a first and a second planetary gear set to achieve a desired set of operating drive ranges. In one example, the reverse clutch and one of the forward clutches may be rotationally coupled to a common shaft. This twin clutch design may enable manufacturing costs to be decreased and enable the transmission to achieve a more compact design. Further, in such an example, the second forward clutch may rotate on a shaft offset from the other clutches and planetary assemblies. In this way, the transmission may achieve a targeted degree of drop (e.g., a distance between the input and output interfaces). Further in one example, a hydrostatic assembly in the transmission may be a U-shaped hydrostatic unit where the mechanical input shafts for a hydraulic pump (e.g., variable displacement pump) and a motor (e.g., fixed bent axis motor) that are parallel to one another and arranged on one side of the unit permits the unit's size to be reduced and avoid the use of high pressure hoses to reduce manufacturing costs as well the chance of hydrostatic unit degradation.

In the transmission, a hydrostatic branch, which includes a hydraulic motor and a pump, are arranged in parallel with mechanical branches and coupled to a motive power source (e.g., an engine, an electric motor, combinations thereof, or other suitable prime mover). In one example, sun gears of the planetary gear sets are rotationally coupled to one another and the hydrostatic branch. Because the sun gears are attached together the transmission may achieve greater space efficiency.

The shifting strategy employed in the system may include, holding one of the clutches open, while synchronously opening and closing the remaining clutches. Such a shifting strategy may be used to smoothly transition between two drive ranges in a group of drive ranges that includes a reverse drive range and two forward drive ranges. Consequently, power interruption and noise, vibration, and harshness (NVH) during shifting transients may be reduced (e.g., avoided). Further, the transmission's efficiency may be increased when using this shifting strategy.

Figure 1:
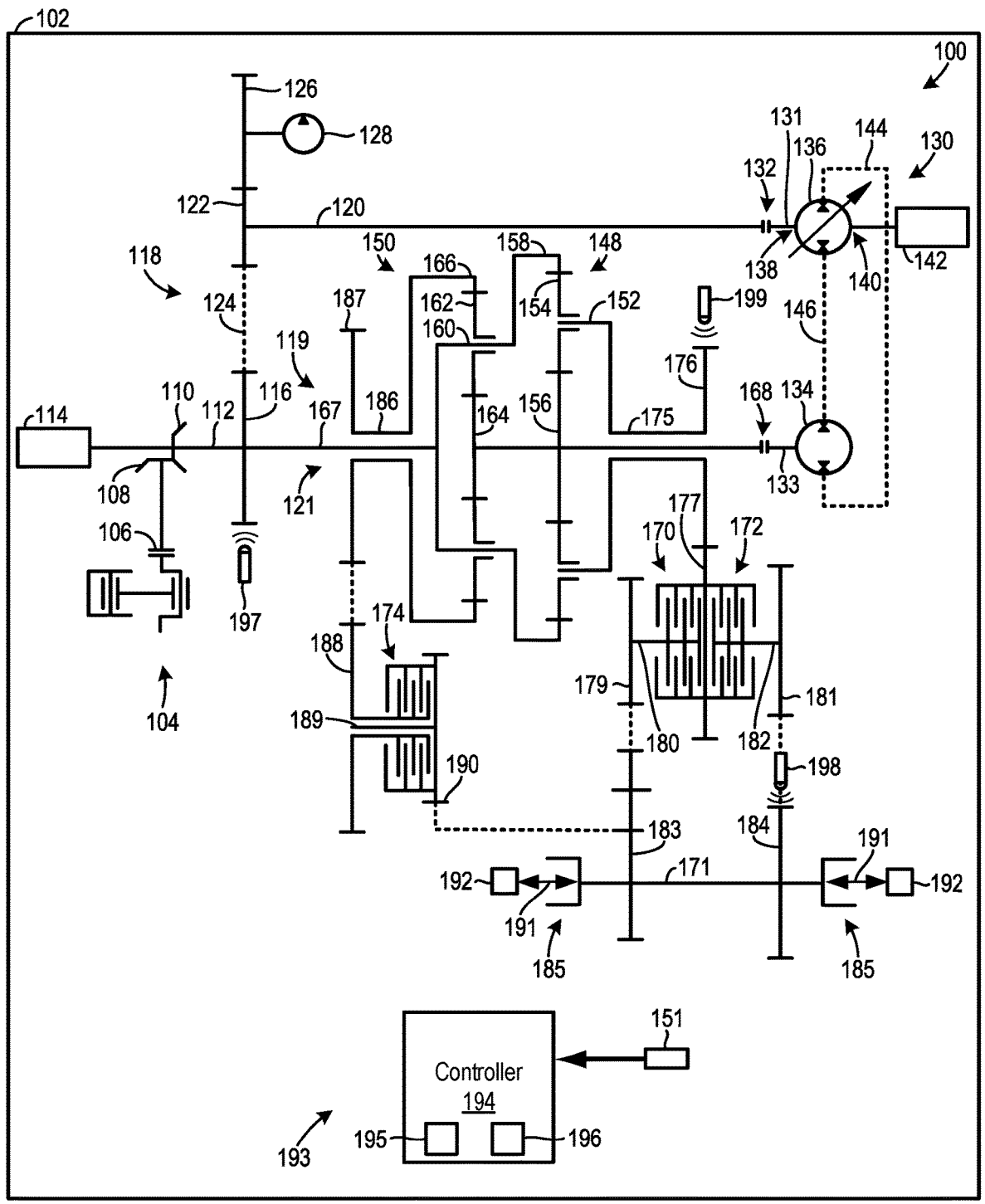
FIG. 1 is a schematic representation of a vehicle with an hydromechanical transmission.
Figure 2:
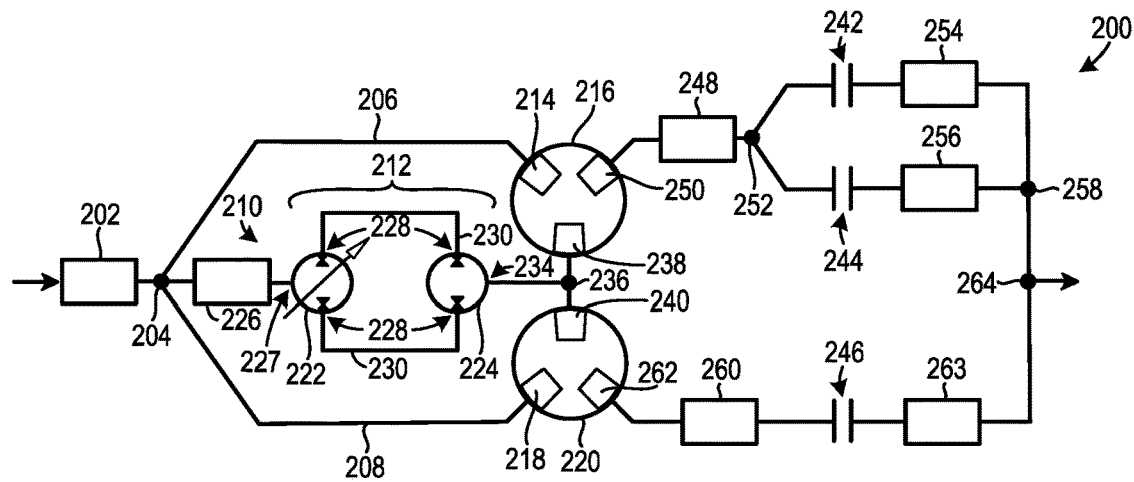
FIG. 2 is first example of a hydromechanical transmission system.
Figure 11:
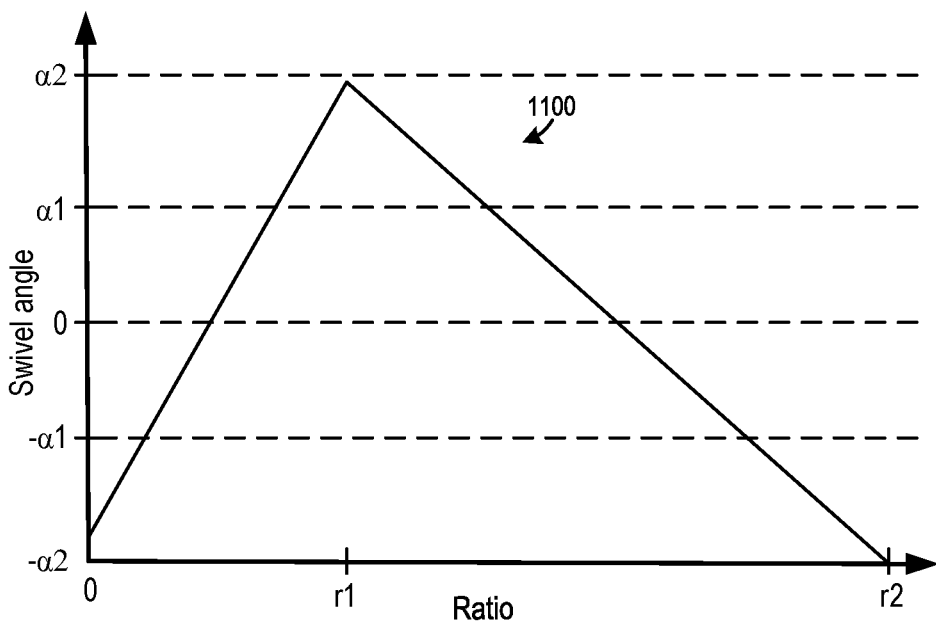
FIGS. 11-12 are exemplary diagrams of pump swivel angle vs. hydrostatic ratio in the hydrostatic assembly.
Figure 12:
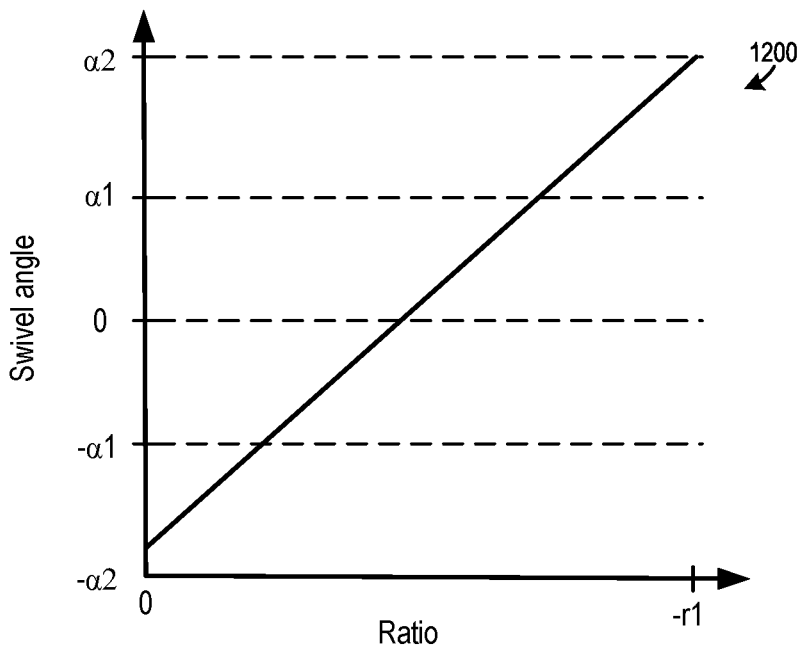
Figure 13:
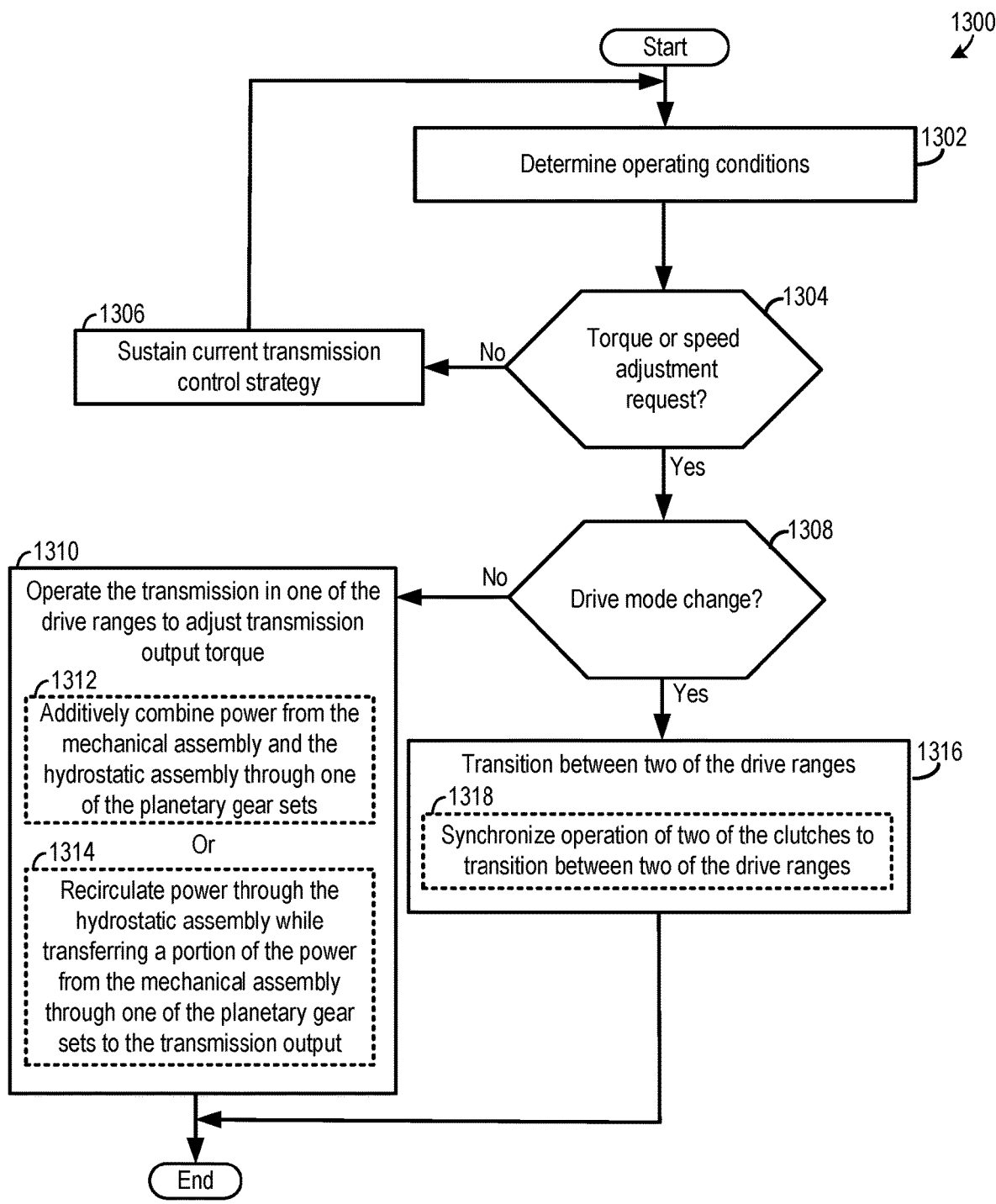
FIG. 13 is a method for operating a transmission system to shift between drive ranges.
Figure 14:
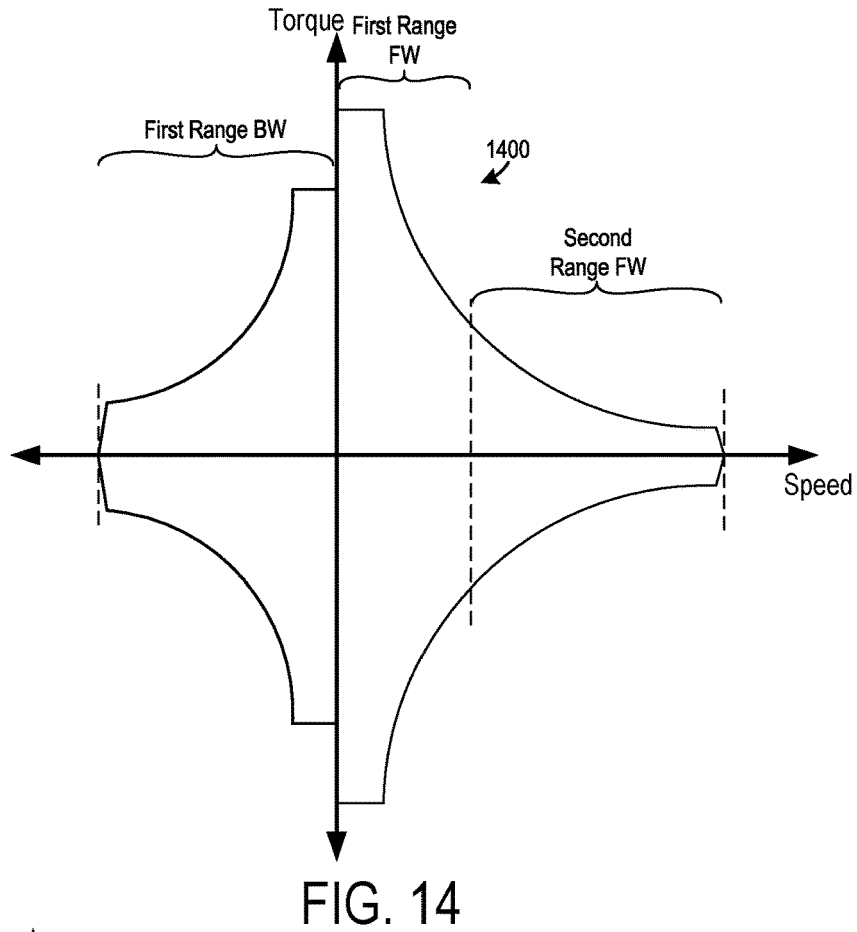
FIG. 14 is an exemplary diagram of a transmission power limit curve.
Figure 17:
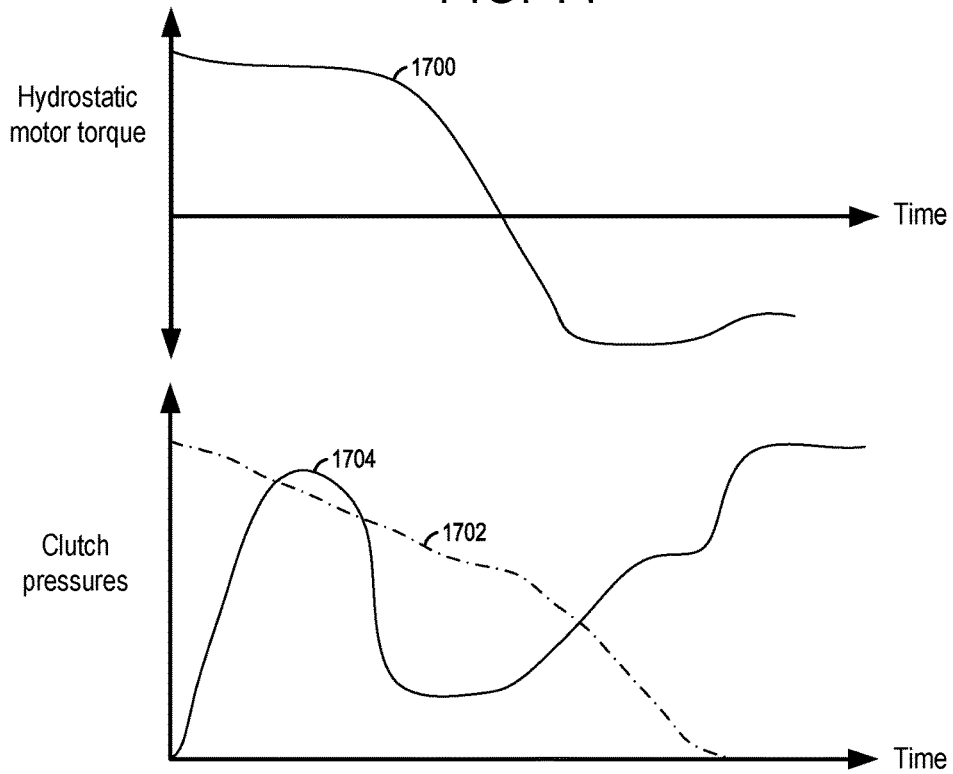
FIG. 17 shows exemplary diagrams of hydrostatic motor torque vs. time and clutch pressures vs. time.
Figure 15:
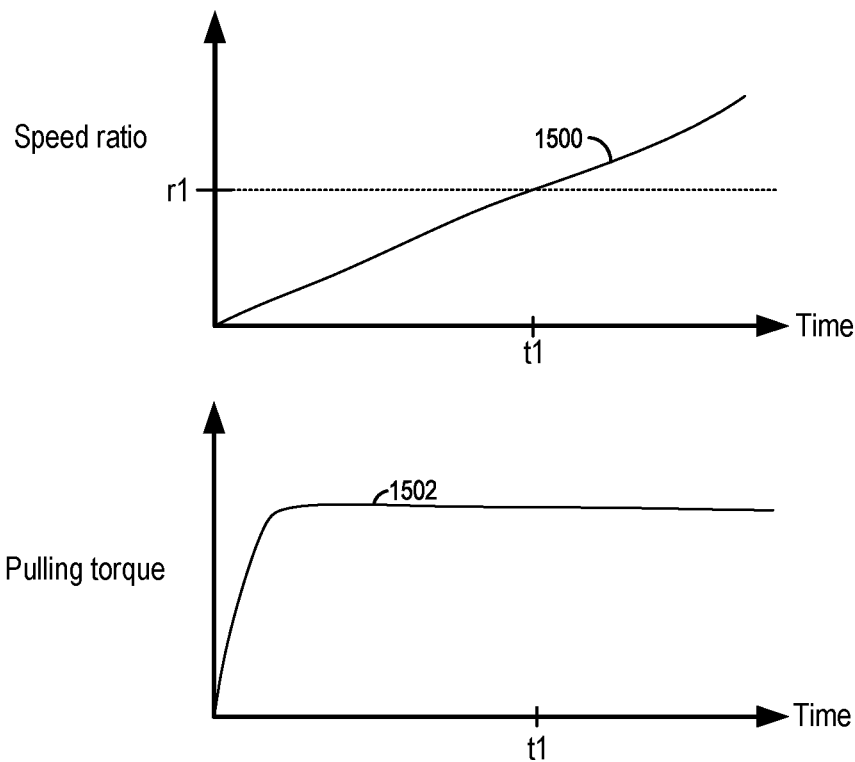
FIG. 15 shows exemplary diagrams of transmission speed ratio vs. time and transmission pulling torque vs. time.
Figure 16:
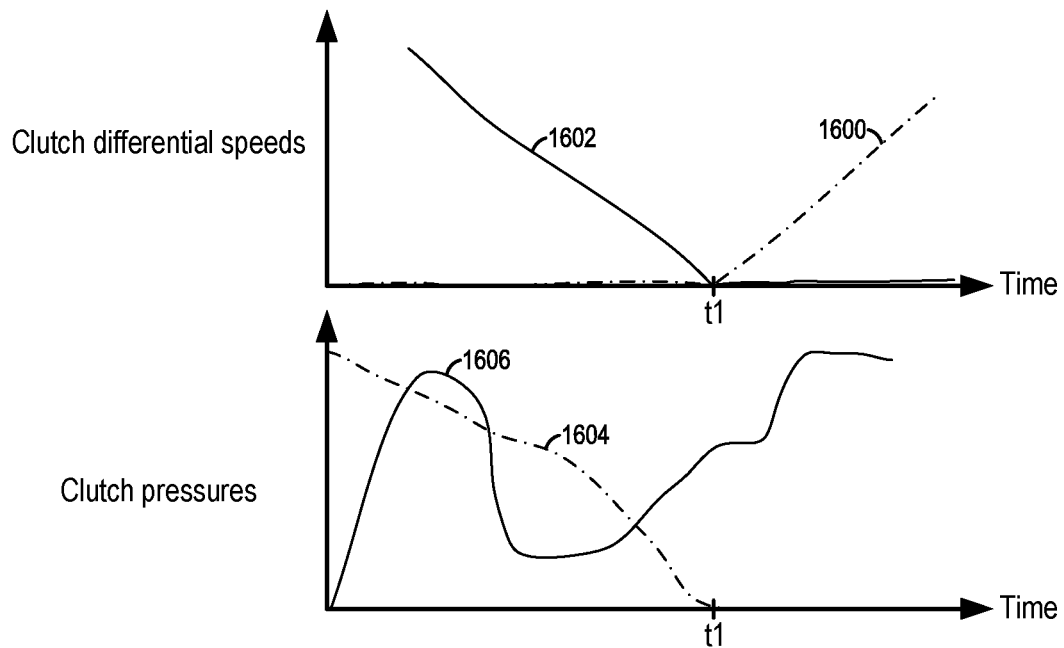
FIG. 16 shows exemplary diagrams of clutch differential speeds vs. time and clutch pressures vs. time.
Figure 18:
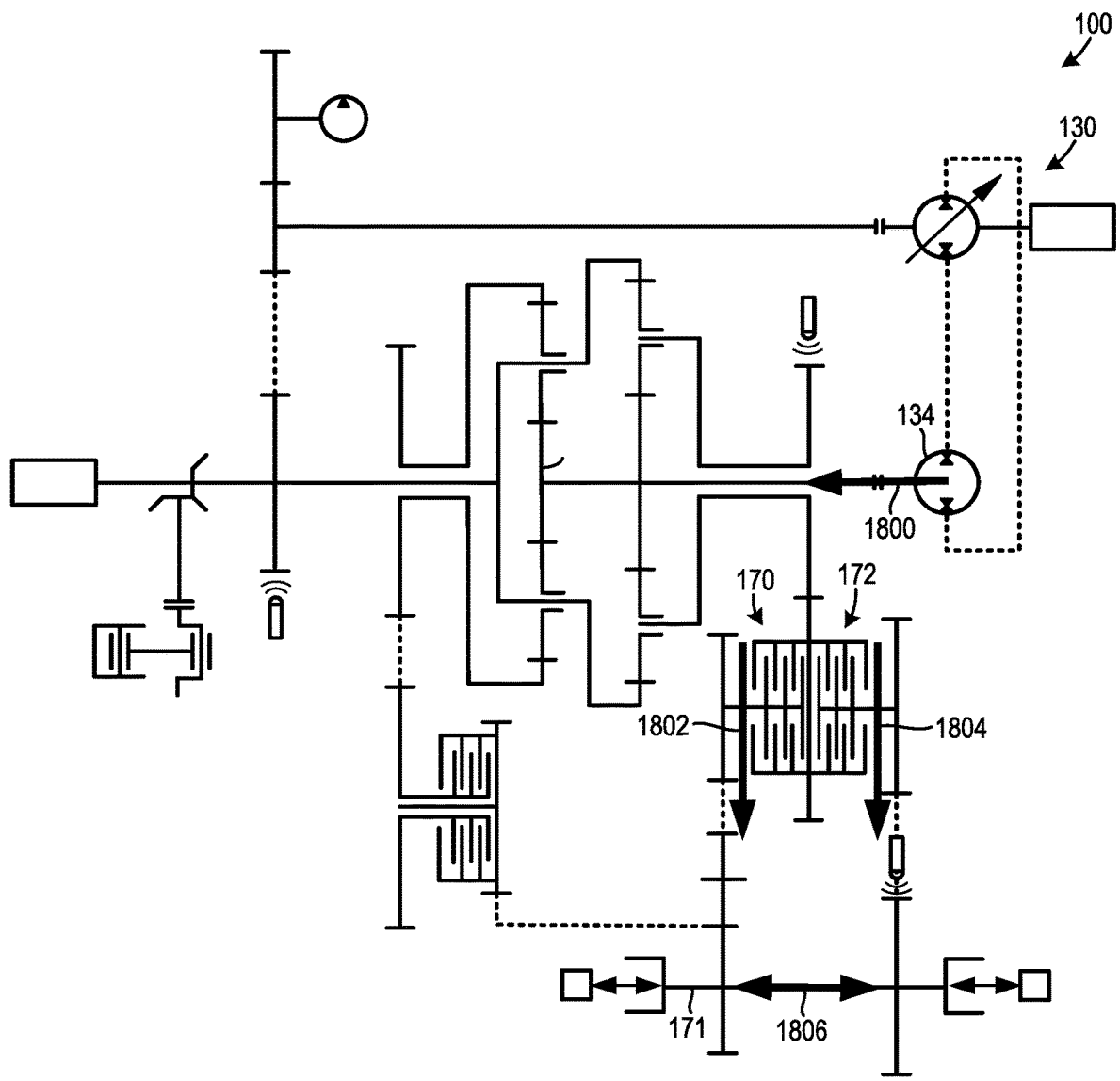
FIG. 18 shows an example of a reverse shift operation in the transmission depicted in FIG. 1.

FIG. 1 illustrates a schematic depiction of a transmission system with a hydromechanical power split. FIG. 2 shows a first example of a transmission system designed to provide continuously variable input to output speed adjustability using a wolf symbolic scheme. FIGS. 3-8 depict the first example of the transmission system in different operating drive ranges in which power is additively combined or recirculated using the power split arrangement. FIG. 9 shows a chart which indicates the state of the clutches in the first example of the transmission system in the different drive ranges. FIG. 10 illustrates an exemplary graph of the hydrostatic ratio vs. the mechanical transmission ratio in different drive ranges. FIGS. 11-12 depict exemplary graphs of pump swivel angle vs. the hydrostatic ratio in the forward and reverse drive ranges. Exemplary as used herein does not denote any sort of preferential indication but rather signifies one among multiple potential configurations. FIG. 13 shows a method for smoothly and efficiently shifting between drive ranges in a transmission system. As described herein, a smooth shift is indicative of a shifting event in which power interruption is reduced (e.g., avoided). Thus, a smooth shift may significantly reduce or in some cases avoid power transfer spikes or drops during shifting operation. Smooth shifts therefore allow transmission efficiency to be increased as well as vehicle drivability and drive comfort. FIG. 14 depicts a use-case power limit curve for a hydromechanical transmission. FIGS. 15-17 depict different diagrams with plots the embody a use-case shifting strategy. FIG. 18 shows the transmission, illustrated in FIG. 1, during reverse shifting operation.

FIG. 1 shows a schematic depiction of a transmission system 100 (e.g., a hydromechanical variable transmission) in a vehicle 102 or other suitable machine platform. In one example, the vehicle may be an off-highway vehicle, although the transmission may be deployed in on-highway vehicles, in other examples. An off-highway vehicle may be a vehicle whose size and/or maximum speed precludes the vehicle from being operated on highways for extended durations. For instance, the vehicle's width may be greater than a highway lane and/or the vehicle top speed may be below the highway's minimum allowable or suggested speed, for example. Industries and their corresponding operating environments in which the vehicle may be deployed include forestry, mining, agriculture, and the like. In either case, the vehicle may be designed with auxiliary system driven via hydraulic and/or mechanical power take-offs (PTOs).

The transmission system 100 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios. Further, in one use-case example, the transmission may be configured to operate in an environmental temperature range from −40° C.-80° C. In such an example, a sump, in a transmission lubrication system, may operate in a range between −40° C.-100° C. However, the transmission may be designed for a variety of operating temperature ranges. Further, in certain examples, the transmission system may be designed to operate on a longitudinal slope up to 35 degrees and a lateral inclination of 25 degrees. Although the longitudinal slope and/or lateral inclination threshold may be adjusted (e.g., increased or decreased) to suit different end-use design goals.

The transmission system 100 may have asymmetric maximum output speeds for forward and reverse direction (e.g., reverse drive speed may offer approximately 56% of the forward drive speed). This forward-reverse speed asymmetry may enable the transmission to achieve a desired breadth of speed ranges. However, other suitable output speed variations have been contemplated, such as symmetric output speeds in the forward and reverse directions, which may however, demand the use of an additional clutch which may increase system complexity.

The transmission system 100 may include or receive power from a motive power source 104. The power source 104 may include an internal combustion engine, electric motor (e.g., electric motor-generator), combinations thereof, and the like. In one use-case example, the power source 104 may generate greater than 80 kilowatts (kW) of power (e.g., 100-115 kW). To elaborate, the power source may be operated in the range between 900-2100 revolutions per minute (RPM) with a targeted range between 1200-1600 RPM, in some instances. Further, in some examples, the engine idle speed may be approximately 650 RPM. However, numerous suitable transmission operating and idle speed ranges have been envisioned.

A torsional damper coupling 106 may be further provided in the transmission. Gears 108, 110, such as bevel gears, may be used to rotationally couple the power source 104 to an input shaft 112. As described herein, a gear may be a mechanical component which rotates and includes teeth that are profiled to mesh with teeth in one or more corresponding gears to form a mechanical connection that allows rotational energy transfer therethrough.

A mechanical PTO 114 may be coupled to the input shaft 112. The mechanical PTO 114 may drive an auxiliary system such as a pump (e.g., a hydraulic pump, a pneumatic pump, and the like), a winch, a boom, a bed raising assembly, and the like. To accomplish the power transfer to auxiliary components, the PTO may include an interface, shaft(s), housing, and the like. However, in other examples, the PTO may be omitted from the transmission system. A gear 116 may be coupled to the input shaft 112. A mechanical assembly 118 is further included in the transmission system 100. The mechanical assembly 118 may include the shaft 112 and/or the gear 116 as well as shaft 167, described in greater detail herein. Further, the transmission may include a shaft 120 and a gear 122 rotationally coupled to the gear 116 on the input shaft 112. Dashed line 124 and the other dashes lines depicted in FIG. 1 indicate a mechanical connection between components which facilitates rotational energy transfer therebetween.

A gear 126 meshing with gear 122 may be rotationally attached to a charging pump 128. The charging pump 128 may be designed to deliver pressurized fluid to hydraulic components in the transmission such as a hydraulic motor 134 (e.g., hydrostatic motor), a hydraulic pump 136 (e.g., hydrostatic pump), and the like. The fluid pressurized by the charging pump may additionally be used for clutch actuation and/or transmission lubrication. The charging pump may include a piston, a rotor, a housing, chamber(s), and the like to allow the pump to move fluid. The mechanical assembly 118 is rotationally coupled in parallel to a hydrostatic assembly 130 (e.g., a hydrostatic unit). Further, the hydrostatic assembly 130 may have a U-shape design where the shafts 131, 133 serve as a mechanical interface for the hydraulic pump 136 (e.g., variable displacement pump) and the hydraulic motor 134 (e.g., fixed bent axis motor), respectively, are parallel to one another and arranged on one side of the assembly. This U-shaped layout permits the hydrostatic assembly's size to be reduced and enables the use of high pressure hoses to be forgone to reduce manufacturing costs as well the chance of hydrostatic unit degradation, if desired. Still further, the hydrostatic assembly 130 may be arranged on an opposite side of the transmission as the charging pump 128 and/or axially offset from clutches 170, 172. Arranging the hydrostatic assembly in this manner permits the width and length of the transmission to be reduced and allows the installation of the transmission in the vehicle to be simplified. Further, the motor and the pump in the hydrostatic assembly may be enclosed a common housing to increase transmission compactness.

The coupling of the hydrostatic assembly to the mechanical assembly enables the transmission to achieve power split functionality in which power may synchronously flow through either path to additively combine or recirculate power through the system. This power split arrangement enables the transmission's power flow to be highly adaptable to increase efficiency over a wide range of operating conditions. Thus, the transmission may be a full power split transmission, in one example.

The mechanical assembly 118 may include multiple mechanical paths that are coupled in parallel to the hydrostatic assembly. To elaborate, the shaft 167 may serve as a junction for a first mechanical path (e.g., branch) 119 and a second mechanical path (e.g., branch) 121. The first mechanical path 119 may provide rotational energy transfer capabilities from an interface of the hydrostatic assembly 130 to a ring gear 158 of a first planetary gear set 148, during certain operating conditions. Additionally, the second mechanical path 121 may provide rotational energy transfer capabilities from the interface of the hydrostatic assembly 130 to a carrier 160 of a second planetary gear set 150.

The hydrostatic assembly 130 includes the hydraulic motor 134 and the hydraulic pump 136. Further, the hydraulic pump 136 may include a first mechanical interface 138 and a second mechanical interface 140. The first mechanical interface 138 may be rotationally coupled to a mechanical bushing 132 and the second mechanical interface 140 may be rotationally coupled to another mechanical PTO 142. Again, the mechanical PTO may be used to drive an auxiliary vehicle system such as an air compressor, a mechanical arm or boom, an auger, and the like. In this way, the transmission may be adapted for a variety of end-use operating environments. Providing multiple PTOs, in the arrangement depicted in FIG. 1, enables the transmission system to meet end-use design goals in a variety of different types of vehicles, if wanted. As such, the system's applicability is expanded and the customer appeal of the transmission is increased. However, in other examples, the PTOs 114 and/or 142 may be omitted from the transmission.

The hydraulic pump 136 may be a variable displacement bi-directional pump, in one example. Further, the pump may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 134 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness, for instance.

Hydraulic lines 144, 146 are attached to hydraulic interfaces in each of the motor and pump to enable the hydrostatic assembly to provide additive and power circulation functionality with regard to the mechanical branches arranged in parallel with the hydrostatic assembly 130. For example, in an additive power mode, power from both the hydrostatic and mechanical assemblies is combined at one of the planetary gear sets and delivered to the transmission output. Therefore, the hydraulic pump 136 and the motor 134 may be operated to flow power to the sun gears of either planetary assembly from the hydraulic motor. In a recirculating power mode, power is recirculated through the hydrostatic assembly. Therefore, in the recirculating power mode, power flows from the hydrostatic assembly to the shaft 120.

The transmission system 100 further includes the first planetary gear set 148 and the second planetary gear set 150. The first planetary gear set 148 may include a carrier 152 on which planet gears 154 rotate. The planet gears 154 may mesh with a sun gear 156 and the ring gear 158. Likewise, the second planetary gear set 150 may include the carrier 160, planet gears 162, a sun gear 164, and a ring gear 166. Therefore, the second planetary gear set 150 may again be a simple planetary gear set. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motion.

The carrier 160 of the second planetary gear set 150 may be rotationally coupled to the ring gear 158 of the first planetary gear set 148. Further, the carrier 160 of the second planetary gear set 150 may be rotationally coupled to a shaft 167. The shaft 167 may extend through a central opening in an extension 186, described in greater detail herein. This rotational attachment scheme may be conceptually described as a formation of mechanical branches attached in parallel to the hydrostatic assembly 130.

As described herein a parallel attachment between components, assemblies, and the like, denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased, which allows gains in operating efficiency to be realized, when compared to purely hydrostatic transmissions.

The sun gears 156, 164 of the first and second planetary gear sets 148, 150 may be rotationally coupled (e.g., directly attached) to one another. Attaching the sun gears in this manner may enable the transmission to achieve a desired gear ratio, compactness, and efficiency.

The hydraulic motor 134 may be rotationally coupled to the sun gear 156 via a mechanical bushing 168, for instance. The transmission system 100 further includes a reverse clutch 170, a first forward drive clutch 172, and a second forward drive clutch 174. More generally, the first forward drive clutch may be referred to as a first clutch or a first forward clutch, the reverse drive clutch may be referred to as a second clutch or a reverse clutch and the second forward drive clutch may be referred to as a third clutch or a second forward clutch. The clutches 170, 172, 174 may be positioned near to an output shaft 171 and downstream of the planetary assembly. Arranging the clutches in this location allows a desired compromise between clutch size and clutch speed. For instance, relatively high clutch speeds may generate higher power losses. Further, the reverse clutch 170 and the first forward drive clutch 172 may be arranged adjacent and coaxial to one another. In one particular example, the clutches may have a similar design to reduce manufacturing complexity. This twin clutch arrangement therefore permits manufacturing costs to be reduced and increases the transmission's compactness.

The clutches 170, 172, 174 may be friction clutches that each include two sets of plates. The clutch plates may rotate about a common axis and are designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. Further, the clutches may be hydraulically, electromagnetically, and/or pneumatically actuated. For instance, the clutches may be adjusted via a hydraulic piston. The adjustability may be continuous, in one example, where the clutch may transition through partially engaged states to a fully engaged state, where a relatively small amount of power loss occurs in the clutch. However, in other examples, the clutches may be discretely adjusted.

The carrier 152 may include an extension 175 with a gear 176 that meshes with a gear 177. The gear 177, in the illustrated example, is rotationally coupled to the reverse clutch 170 and the first forward clutch 172. The reverse clutch 170 and the first forward clutch 172 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 179 may reside on an output shaft 180 of the reverse clutch 170. Likewise, a gear 181 may reside on an output shaft 182 of the first forward clutch 172. Both gears 179, 181 may be rotationally attached to the system output shaft 171 via gears 183, 184 respectively. In this way, both the reverse clutch and the first forward clutch deliver power to the transmission's output, during different operating conditions.

The system output shaft 171 may include one or more interfaces 185 (e.g., yokes, gears, chains, combinations thereof, and the like). The output shaft is specifically illustrated with two outputs. However, the transmission may include an alternate numbers of outputs. The gear 179 is rotationally coupled to the output shaft via meshing with gear 183. Arrows 191 depict the flow of power from the transmission system to drive axles 192 and/or other suitable downstream vehicle components or vice versa. A driveline with a shaft, joints, and the like may be used to carry out the power transfer between the transmission and the axles. It will be understood that the drive axles may be coupled to drive wheels.

The ring gear 166 of the second planetary gear set 150 may include the extension 186 with a gear 187 position thereon. The gear 187 may be rotationally attached to a gear 188 in the second forward clutch 174, as indicated via a dashed line. The gear 188 may be coupled to a first set of plates in the clutch 174. A second set of plates in the clutch may be attached to an output shaft 189 and a gear 190. The gear 190 may be rotationally coupled to the gear 183, as indicated by a dashed line. Due to the aforementioned arrangement of the clutches and the planetary gear sets, the transmission system 100 achieves a higher efficiency and enhanced drivability, comfort, and productivity than previous hydromechanical transmissions.

The transmission system 100 may additionally include a lubrication system which may include a sump, as previously discussed. This lubrication system may further include conventional components for lubricating the gears and/or the clutches such as pumps, conduits, valves, and the like.

A control system 193 with a controller 194 may further be incorporated in the transmission system 100. The controller 194 includes a processor 195 and memory 196. The memory 196 may hold instructions stored therein that when executed by the processor cause the controller 194 to perform the various methods, control strategies, and the like, described herein. The processor 195 may include a microprocessor unit and/or other types of circuits. The memory 196 may include known data storage mediums such as random access memory, read only memory, keep alive memory, combinations thereof, and the like.

The controller 194 may receive vehicle data and various signals from sensors positioned in different locations in the transmission system 100 and/or the vehicle 102. The sensors may include gear speed sensors 197, 198, 199 which detect the speed of gear 116, gear 184, and gear 176, respectively. In this way, gear speed at the input and the output of the system may be detected along with the gear speed at the output of the first planetary gear set 148. However, in other examples, the speeds of at least a portion of the gears may be modeled by the controller.

The controller 194 may send control signals to an actuator in the hydraulic pump 136 or an actuation system coupled to the pump to adjust the pumps output and/or direction of hydraulic fluid flow. Additionally, the clutches 170, 172, 174 may receive commands (e.g., opening or closing commands) from the controller and actuators in the clutches or actuation systems coupled to the clutches may adjust the state of the clutch in response to receiving the command. For instance, the clutches may be actuated via hydraulically controlled pistons, although other suitable clutch actuators have been envisioned. The other controllable components in the transmissions system include the hydraulic motor 134, the motive power source 104, and the like. These controllable components may function similarly with regard to receiving control commands and adjusting an output and/or a state of a component responsive to receiving the command via an actuator. Additionally or alternatively, a vehicle electronic control unit (ECU) may be provided in the vehicle to control the power source (e.g., engine and/or motor). Furthermore, the control system 193 and specifically the controller 194 with the memory 196 and processor 195 may be configured to carry out the shifting methods elaborated upon herein with regard to FIGS. 3-8 and 13.

The transmission system 100 may include an input device 151 (e.g., an accelerator pedal, a control-stick, levers, buttons, combinations thereof, and the like). The input device 151, responsive to driver input, may generate a transmission speed or torque adjustment request and a desired drive direction (a forward or reverse drive direction). Further, the transmission system may automatically switch between drive modes when demanded. To elaborate, the operator may request a forward or reverse drive mode speed or torque change, and the transmission may increase speed or torque and automatically transition between the drive ranges associated with the different drive modes, when needed. Further, in one example, the operate may request reverse drive operation while the vehicle is operating in a forward drive mode. In such an example, the transmission may automatically initiate a shift (e.g., synchronous shift) between the forward and reverse drive modes. In this way, the operator may more efficiently control the vehicle, in comparison to transmissions designed for manual drive mode adjustment. However, in other examples, the system may be designed to allow the vehicle operator to manually request a mode change between the forward drive ranges, for instance. It will further be appreciated that the power source may be controlled in tandem with the transmission. For instance, when a speed adjustment requested is received by the controller, the power source's output speed may be correspondingly increased.

FIG. 2 shows an illustration of a transmission system 200 using a wolf symbol scheme. In the wolf scheme, lines represent shafts, gears, and/or other mechanisms for rotational energy transfer. Further in the wolf scheme, circles represent planetary gear sets and boxes represent non-planetary gear sets which may include shafts, gears, and the like. Each gear set may have an associated ratio. Further, in the wolf scheme clutches are represented via parallel lines and junctions where power is combined from multiple branches are represented via solid dots. The junctions may include gears, shafts, shaft sections, and the like. The transmission system 200 shown in FIG. 2 is an example of the transmission system 100 shown in FIG. 1. Because of this correspondence, these transmission systems may share common functional and structural features. Repeated description is therefore omitted for concision.

The transmission system 200 may include an internal combustion engine 202 or other suitable motive power source (e.g., electric motor or motor-generator). A first junction 204 rotationally couples two mechanical branches 206, 208 to a hydrostatic branch 210 with the hydrostatic assembly 212. The first mechanical branch 206 may be rotationally attached to a ring gear 214 in a first planetary gear set 216. Conversely, the second mechanical branch 208 may be rotationally attached to a carrier 218 in a second planetary gear set 220.

The hydrostatic assembly 212 includes a hydraulic pump 222 and a hydraulic motor 224. Further, a gear set 226 may be arranged in the hydrostatic branch between the pump 222 and the engine 202. The gear 226 may be rotationally coupled to a mechanical interface 227 of the pump 222. Hydraulic interfaces 228 in each of the pump and the motor may be in fluidic communication via conduits 230. A mechanical interface 227 of the pump may be mechanically attached to the gear set 226. Further, a mechanical interface 234 of the motor may be mechanically attached to a second junction 236. The second junction 236 serves as a rotational connection between sun gears 238, 240 of the first and second planetary gear sets 216, 220.

The transmission system 200 again may include a reverse clutch 242, a first forward clutch 244, and a second forward clutch 246. These clutches are mechanically coupled in parallel to allow one of the clutches to be engaged while the others are disengaged in the different drive ranges. In this way, each clutch corresponds to a different drive range.

A gear set 248 may be rotationally coupled to a carrier 250 of the first planetary gear set 216. The gear sets shown in FIG. 2 may include two gears. A junction 252 may serve as a mechanical connection between the gear set 248 and the clutches 242, 244. Further, a gear set 254 may be rotationally coupled to the reverse clutch 242 and a gear set 256 is coupled to the first forward clutch 244. Another junction 258 may serve to rejoin the mechanical branches associated with the reverse clutch and the first forward clutch. A ring gear 262 of the second planetary gear set 220 may be rotationally coupled to the gear set 260. Further, a gear set 263 may be coupled to the second forward clutch 246 and a junction 264. The junction 264 may function as an output for the three clutch branches.

FIGS. 3-8 depict power paths through the transmission system 200 in different drive ranges. Arrows with cross-hatching depict a circulating power flow in which the power path travels to back to upstream components. Conversely, arrows without cross-hatching depict a downstream power flow towards the transmission output.

Figure 3:
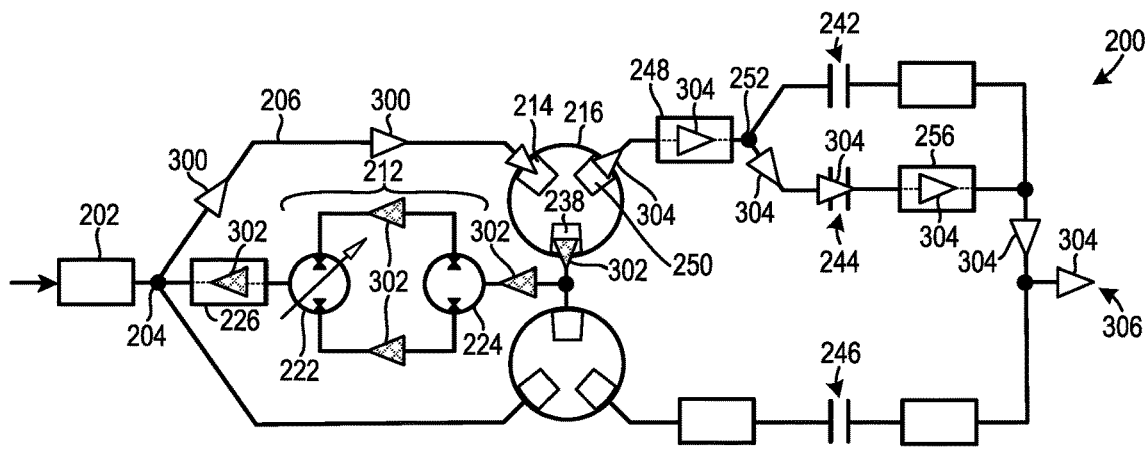

Turning specifically to FIG. 3, showing the transmission system operating in a first stage of the first drive range. In the first drive range, the first forward drive clutch 244 is engaged and the reverse drive clutch 242 and the second forward drive clutch 246 are disengaged. As such, in the first drive range the transmission is in an input coupled power split mode.

In this power split mode, arrows 300 indicate the path of power from the engine 202 to the junction 204, from the junction 204 to the first mechanical branch 206, and from the first mechanical branch to the ring gear 214 of the first planetary gear set 216. Arrows 302 indicate the recirculation of power from the sun gear 238 of the first planetary gear set 216 to the hydraulic motor 224, from the hydraulic motor to the hydraulic pump 222, from the hydraulic pump to the gear set 226, and from the gear set to the junction 204. Arrows 304 indicate the power path from the carrier 250 of the first planetary gear set 216 to the gear set 248, from the gear set 248 to the first forward drive clutch 244 via the junction 252, from the first forward drive clutch to the gear set 256, and from the gear set 256 to the transmission's output 306. In this way, a portion of the power is circulated back through the hydrostatic assembly 212 while another portion is transferred through the clutch to the output. Due to the circulation of the power through the hydrostatic assembly, the transmission may be operated with a relatively high efficiency when compared to solely mechanical or hydrostatic transmissions.

Figure 4:
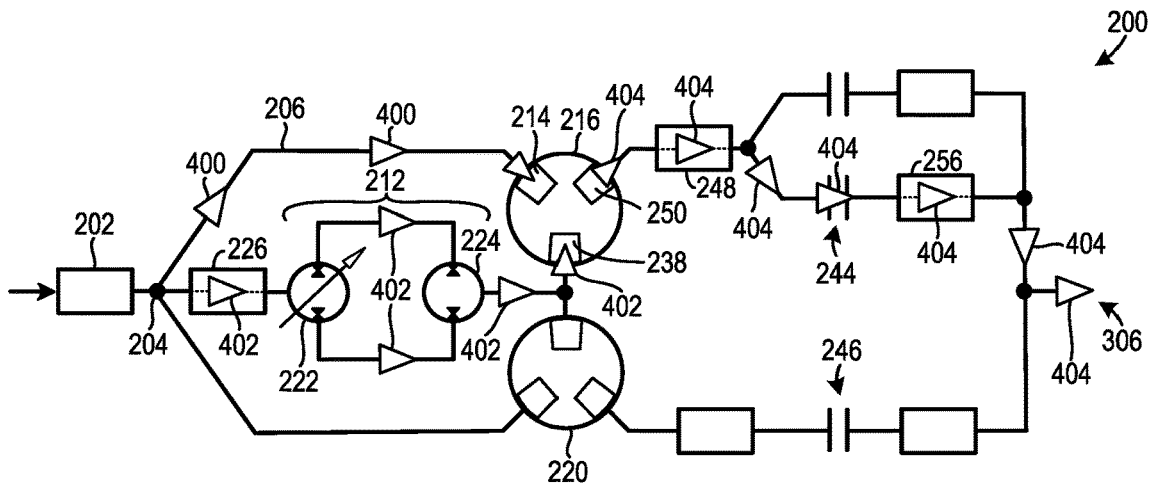

In a second stage of the first drive gear range, the hydraulic power path changes directions. During this directional change, the power in the hydraulic path crosses zero and goes to additive power of mechanical and hydraulic paths, as shown in FIG. 4.

In the second stage of the first drive range, the power path travels through the first mechanical branch 206 and the hydrostatic assembly 212 in parallel. Further, in the second stage of the first drive range, power from the mechanical and hydrostatic branches are additively combined at the first planetary gear set 216 and then transferred through the first forward clutch 244 to the transmission output 306. Specifically, as illustrated in FIG. 4, arrows 400 indicate the power path through the mechanical branch 206 to the ring gear 214 of the first planetary gear set 216. Further, arrows 402 indicate the power path through the hydrostatic branch (the gear set 226, the hydraulic pump 222, and the hydraulic motor 224) to the sun gear 238 of the first planetary gear set 216. Further, arrows 404 indicate the power path from the carrier 250 of the first planetary gear set 216 to the gear set 248, from the gear set to the first forward clutch 244, from the first forward clutch to the gear set 256, and from the gear set to the output 306.

When the ring gear speed of the second planetary gear set 220 allows synchronization of the second forward clutch 246, the drive range is changed (e.g., transitioned from the first to the second drive range) by opening the first drive clutch 244 and closing the second drive clutch 246 via a synchronous shift, for example. Closing a friction clutch involves the frictional engagement of sets of plates in the clutch to transfer power between the clutch's input and output. Conversely, opening a friction clutch involves frictional disengagement of the sets of plates in the clutch to decouple the clutch's input from the output. Further, a synchronous shift includes concurrently opening one clutch while closing another.

Figure 5:
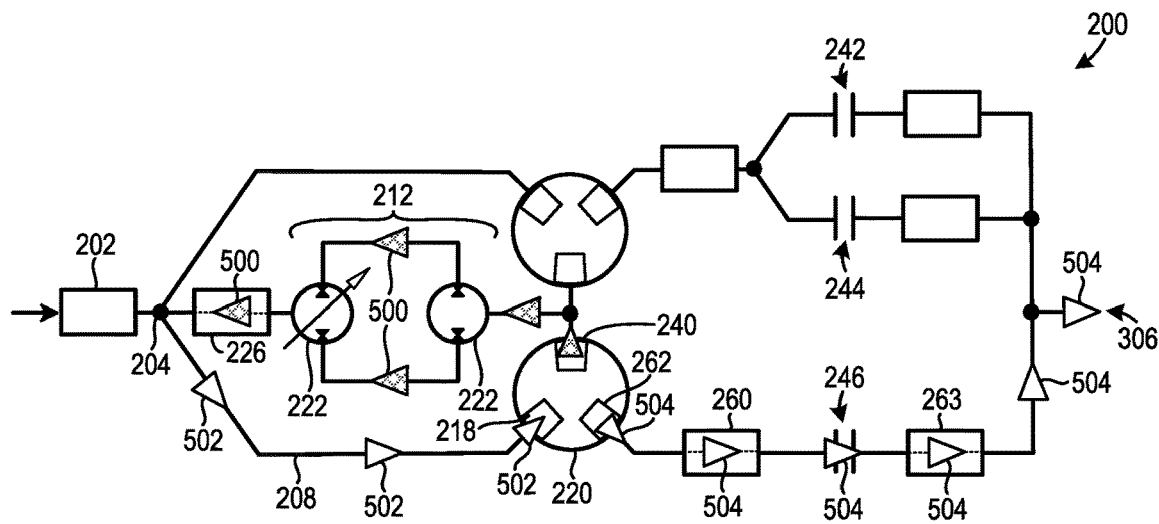

FIG. 5 correspondingly shows the transmission system 200 operating in a first stage of the second forward drive range. In the second forward drive range, the transmission works similarly to the first forward drive range but with a different mechanical path ratio. In the second range, the reverse clutch 242 and the first forward clutch 244 are each disengaged, and the second forward clutch 246 is engaged.

In the first stage, power is circulated back through the hydrostatic assembly 212 to the second mechanical branch 208. Arrows 500 specifically indicate the power path from the sun gear 240 of the second planetary gear set 220 to the hydrostatic assembly 212. Arrows 500 further indicate power path through the hydrostatic assembly 212 to the gear set 226. The power path through the hydrostatic assembly involves the transfer of power through the hydraulic motor 224 and hydraulic pump 222. The power path from the junction 204, through the second mechanical branch 208, and to the carrier 218 of the second planetary gear set 220 is indicated via arrows 502. Further, arrows 504 indicate the power path from the ring gear 262 to the gear set 260, and through the second forward clutch 246 as well as the gear set 263 to the output 306.

Figure 6:
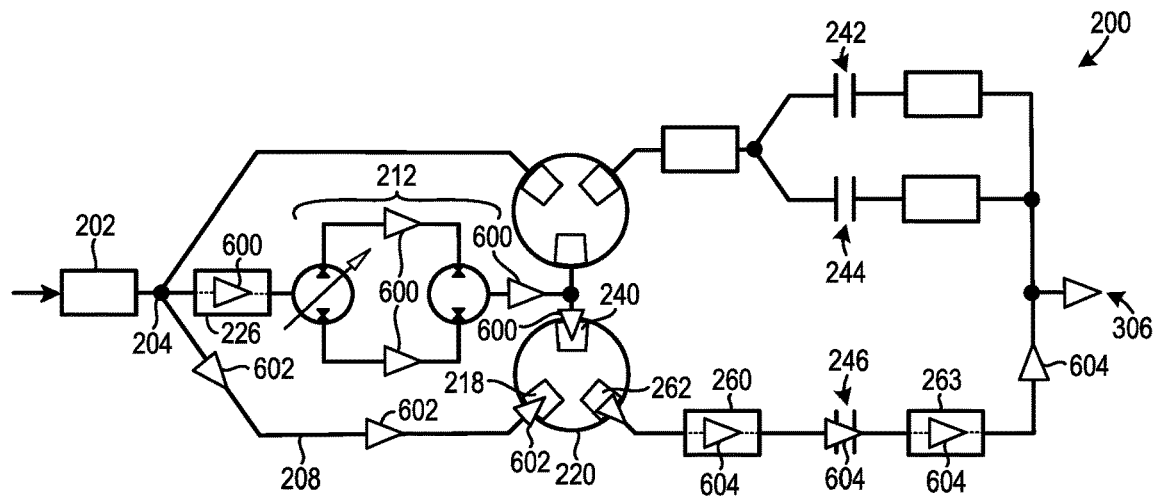

FIG. 6 shows the transmission system 200 operating in a second stage of the second forward drive range after the power flow in the hydraulic path has changed direction (switching from circulating power, crossing zero power of the hydrostatic path, and transitioning to an additive power flow of the mechanical and hydraulic branches). In this way, the ratio in the second forward drive range may be continuously adjusted across the range in an efficient manner.

Arrows 600 embody the power path from the junction 204 through the gear set 226 as well as the hydrostatic assembly 212 to the sun gear 240 of the second planetary gear set 220. Arrows 602 indicate the power path from the junction 204, through the second mechanical branch 208, and to the carrier 218 of the second planetary gear set 220. Additionally, arrows 604 indicate the power path from the ring gear 262 of the second planetary gear set 220, through the gear set 260, second forward clutch 246 as well as the gear set 263, and to the transmission output 306.

Figure 7:
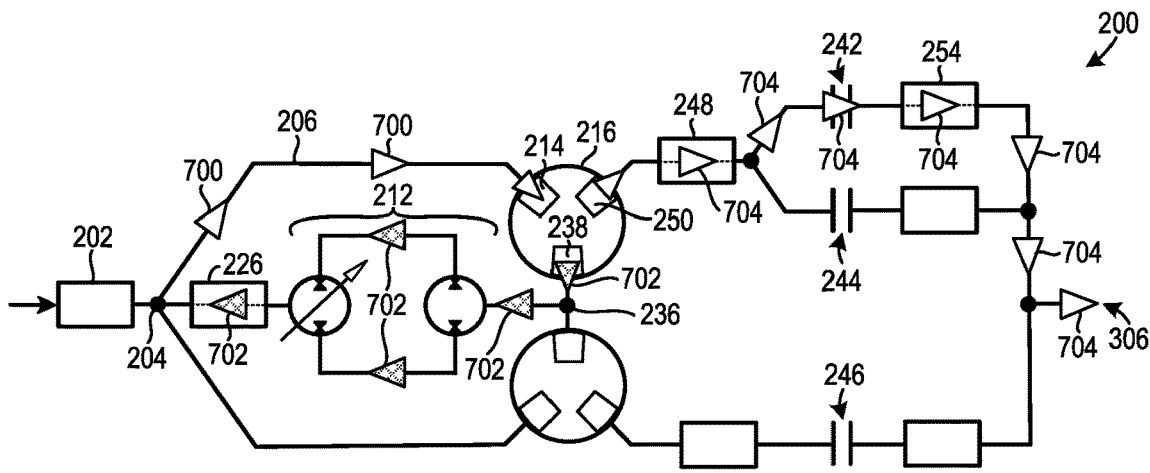

FIGS. 7 and 8 illustrate a first and second stage of the reverse drive range. The reverse range is similar to the first forward drive range, only that the transmission ratio in the mechanical path through the gear set 254 inverts the output speed direction. In the reverse drive range, the reverse clutch is engaged and the first and second forward clutches are disengaged. FIG. 7 specifically depicts arrows 700 which embody a power path from the junction 204, through the first mechanical branch 206, and to the ring gear 214 in the first planetary gear set 216. Arrows 702 embody the power path that circulates through the hydrostatic assembly 212 and the gear set 226. Further, arrows 704 indicate the power path from the carrier 250 of the first planetary gear set 216, through the gear set 248, the reverse clutch 242, as well as the gear set 254, and to the transmission output 306.

Again, during the reverse drive range, power flow in the hydraulic path changes direction (switching from a power circulation configuration, crossing zero power of the hydrostatic path, and transitioning to an additive power flow configuration, indicated in FIG. 8). Arrows 800 in FIG. 8 indicate the power path which travels through the first mechanical branch 206 and to the ring gear 214 of the first planetary gear set 216. Arrows 802 indicate the power path through the hydrostatic assembly 212 to the sun gear 238 of the first planetary gear set 216. After the power is additively combined in the first planetary gear set, power travels from the carrier 250 to the output 306 via the reverse clutch 242, as indicated via arrows 804.

FIG. 9 shows a chart 900 that illustrates the configurations (engaged or disengaged) of the clutches 242, 244, 246, shown in FIGS. 2-8 in the different drive modes (a reverse drive range, a first forward drive range, and second forward drive range). In the reverse drive range, the reverse clutch 242 is engaged while the clutches 244, 246 are disengaged. Additionally, in the first forward drive range, the first forward clutch 244 is engaged while the clutches 242, 246 are disengaged and in the second forward drive range, the second forward clutch 246 is engaged while the clutches 242, 244 are disengaged. To smoothly and efficiently transition between the different drive modes, the clutches may be synchronously shifted, as previously mentioned.

FIG. 10 shows a plot 1000 with the hydrostatic ratio represented on the ordinate and the transmission ratio represented on the abscissa. These ratios are examples of ratios that may be generated by the transmission systems described above with regard to FIGS. 1-9. To elaborate, the ordinate and abscissa indicate zero values of the other corresponding ratios. As such, points below the abscissa represent negative hydrostatic ratios and points above the abscissa represent positive hydrostatic ratios. Points to the left of the ordinate represent negative transmission ratios and points to the right of the ordinate represent positive transmission ratios. Further, the different drive ranges (a reverse drive range, a first forward drive range, and a second forward drive range) for the transmissions operating modes are demarcated. However, other transmission embodiments may have alternate correspondence between the hydrostatic ratio and the transmission ratio.

In the reverse drive range, power is recirculated through the hydrostatic assembly in a first portion of the range. Conversely, in a second portion of the range, power is additively combined from the mechanical branch and the hydrostatic branch. Transmission ratio value –tr1 indicates the boundary between the first and second portions of the reverse drive range.

At 1002, a shift (e.g., synchronous shift) occurs between the reverse clutch and first forward clutch and the transmission enters the first forward drive range or vice versa. In a first part of this drive range, power is recirculated through the hydrostatic assembly, similar to the reverse drive range. However, in the first forward drive range, the transmission's output is rotating in an opposite direction when compared to the reverse drive range. In a second portion of the first forward drive range, power from the hydrostatic assembly and the mechanical assembly is additively combined at the first planetary gear assembly. Transmission ratio value tr1 denotes the boundary between the first and second portions (recirculation and additive power arrangements) of the first forward drive range.

At 1004, a shift (e.g., synchronous shift) occurs between the first forward clutch and the second forward clutch or vice versa. In a first portion of the second forward drive range, power is recirculated through the hydrostatic assembly from the second planetary gear set. Conversely, in a second portion of the second forward drive range, power from the second mechanical branch and the hydrostatic assembly is additively combined at the second planetary gear set.

FIGS. 11-12 show pump swivel angle diagrams with sequential control. These diagrams serve as examples of swivel angle adjustments that may be implemented via the hydraulic pump in the transmission systems, described above with regard to FIGS. 1-9. When a fixed bent axis motor is used in the transmission, the swivel angle may be equivalent to the hydrostatic ratio, illustrated in FIG. 10. To elaborate, plots 1100, 1200 with a pump swivel angle on the ordinate and a hydrostatic ratio on the abscissa are illustrated in FIGS. 11-12, respectively. Zero swivel angle and hydrostatic ratio values are indicated on both of the ordinate and abscissa. Although specific swivel angle and hydrostatic ratio values are not indicated, negative and positive swivel angles ($\alpha$) are ratios (r) are provided for reference.

FIG. 11 illustrates the pump swivel angle for the forward drive mode. In the forward drive mode, the pump swivel angle reaches a maximum value ($\alpha 2$) and then decreases as the hydrostatic ratio increases. On the other hand, FIG. 12 illustrates the pump swivel angle in the reverse drive mode. In the reverse drive mode, as pump swivel angle increases the hydrostatic ratio decreases until ratio –r1 is reached. As such, the pump swivel angle may be adjusted to alter the ratio of the hydrostatic branch in the different drive modes.

FIG. 13 shows a method 1300 for operation of a hydromechanical transmission. The method 1300 may be carried out by the hydromechanical transmissions and components described above with regard to FIGS. 1-9, in one example. However, in other examples, the method 1300 may be implemented using other suitable hydromechanical transmissions and corresponding components. Further, the method may be carried out as instructions stored in non-transitory memory executed by a processor in a controller. As such, performing the method steps may include sending and/or receiving commands which trigger adjustment of associate components, as previously indicated.

At 1302, the method includes determining operating conditions. The operating conditions may include transmission speed, transmission torque, vehicle speed, operator torque request, operator speed request, ambient temperature, transmission temperature, and the like. These operating conditions may be determined using sensor data and/or modeling algorithms.

At 1304, the method includes determining if a torque or a speed adjustment request has been received. For example, a torque or a speed adjustment request may be generated in response to operator interaction with an input device such as an accelerator pedal, a control stick, a lever, and the like.

If a torque or speed adjustment request has not been received (NO at 1304) the method proceeds to 1306 where the method includes sustaining the current transmission control strategy. For instance, the transmission may be operated at a torque set-point, or a speed set-point in some cases, within one of the drive ranges.

If a torque or speed adjustment request has been received (YES at 1304) the method advances to 1308. At 1308, the method judges whether or not to change drive modes. To elaborate, the transmission may be designed to implement two points of speed ratio synchronization of two of the clutches. The first point synchronizes the first forward clutch (e.g., clutch 172, shown in FIG. 1) and the second forward clutch (e.g., clutch 174, shown in FIG. 1) and the second point synchronizes the first forward clutch and the reverse clutch (e.g., clutch 170, shown in FIG. 1). The instructions in the transmission's controller may be designed to control the torque provided by the transmission to the output shaft. Therefore, the transmission's speed ratio may be a consequence of the torque applied by the transmission. For example, while the engine is operating at a substantially constant speed, if a higher pulling torque is applied by the transmission on the output shaft a higher output shaft acceleration and consequently a higher speed ratio gradient occur. The transmission's speed ratio may be altered as a consequence of an operator torque adjustment request. At a certain point of the acceleration, the transmission's speed ratio will approach a maximum value possible within the current operating drive range. As such, when the maximum speed value is approached, the operating drive range may be changed to prevent interruption of the pulling torque continuity to the wheel. For instance, the transmission may be transitioned from the reverse drive range to the first forward drive range or from the first forward drive range to the second forward drive range. Conversely, when the transmission's actual speed ratio approaches a minimum value of the operating drive range, the transmission may also change the operating drive range. For example, the transmission may transition from the second forward drive range to the first forward drive range or from the first forward drive range to the reverse drive range. Therefore, in such an example, a mode change operation may be implemented where the transmission (e.g., synchronously transitions) from the first forward drive range to the second forward drive range. However, if the torque or speed adjustment request can be handled in the current operational drive range, a drive mode change may be temporarily inhibited.

If it is determined that a mode change should not be carried out (NO at 1308), the method moves to 1310. At 1310, the method includes operating the transmission in one of the drive ranges to adjust transmission output torque. For example, the hydrostatic assembly may be adjusted to alter the transmission's output torque, in one example, or speed, in another example.

Operating the transmission in one of the drive ranges may include either 1312 or 1314 or transitioning between block 1312 and 1314 or vice versa. At 1312, the method may include additively combining power from one of the mechanical branches in the mechanical assembly and the hydrostatic assembly through one of the planetary gear sets. In this way, power may be efficiently combined in the transmission to achieve a target speed or torque.

At 1314, the method may include recirculating power through the hydrostatic assembly while transferring a portion of the power from one of the mechanical branches in the mechanical assembly through one of the planetary gear sets to the transmission output.

If, however, it is judged that a mode change request should be carried out (YES at 1308), the method proceeds to 1316. In one example, a shift command may be generated (e.g., automatically generated) when it is determined a mode change request should be implemented. The shift request may therefore be a request to shift between the reverse drive range and the first forward drive range or the first forward drive range and the second forward drive range or vice versa. At 1316, the method includes transitioning between two of the drive ranges. This transition, which may be referred to as a shifting transient, may include step 1318. At 1318, the method includes, synchronizing operation of two of the clutches to transition between two of the drive ranges. For instance, the reverse clutch may be disengaged while the first forward clutch is engaged or vice versa. In another example, the first forward clutch may be disengaged while the second forward clutch is engaged while the output shaft torque remains at a desired value or vice versa. In this way, the transmission operating drive range may be changed to prevent interruption of the pulling torque continuity to the wheels. Consequently, the transmission performance is increased, thereby increasing customer satisfaction. It will be understood, that the transmission drive mode transitions may be carried out automatically. That is to say, the drive modes may be switched between based on the transmission's speed ratio rather than an explicit request to shift between drive modes via operator interaction with a gear selector.

Method 1300 allows transmission torque adjustments to be smoothly and efficiently carried out. As a results, the operating efficiency of the vehicle using the transmission is increased and transmission longevity may be correspondingly increased, in some cases. Thus, method 1300 enables transmission performance to be enhanced.

FIG. 14 illustrates a prophetic use-case power limit curve 1400. The power limit curve may correspond to one use-case embodiment, of the previously described hydromechanical transmissions. Torque is represented on the ordinate while speed is represented on the abscissa. To elaborate, the ordinate is a zero speed value and the abscissa is a zero torque value. As such, negative speed values are located to the left of the ordinate and positive speed values are located to the right of the ordinate. Further, positive torque values are located above the abscissa and negative torque values are located below the abscissa.

As shown in FIG. 14, the maximum torque in the first forward drive range may be greater than the maximum torque in the reverse drive range. Further, the maximum speed in the reverse drive range may be −2000 RPM and the maximum speed in the second forward drive range may be 3700 RPM. In this way, the transmission's maximum output speeds may be asymmetric for forward and reverse directions. However, numerous suitable maximum torque and speed values have been contemplated. The transmission's power limit curve may be selected based on end-use vehicle design parameters such as vehicle weight, expected PTO loads, expected vehicle loads, and the like.

In another prophetic use-case embodiment, the transmission may provide 100% tractive effort at 1500 RPM and 40% tractive effort at 900 RPM. This may allow the transmission to fulfill load spectrums that the transmission may be anticipated to experience in several intended operating environments. However, other transmission embodiments may have tractive efforts mapped to different speeds and this correlation may be set based on a variety of factors such as expected transmission loads, transmission operating efficiency, and the like.

FIG. 15 shows a prophetic use-case plot 1500 of transmission speed ratio vs. time and a plot 1502 of transmission pulling torque vs. time. Thus, speed ratio and pulling torque are on the ordinates for plots 1500, 1502 and time is on the abscissas. The pulling torque may be a controlled variable. As previously discussed, when the transmission's speed ratio approaches a threshold value r1, a drive range transition may be initiated. The threshold value r1 may specifically correspond to a maximum value possible within the current drive range. As such, the transmission may transition between the first drive range and the second drive range when the maximum value is approached. However, in other examples, when the speed ratio is decreasing, the threshold value may correspond to a minimum value that is possible within the current drive range. Therefore, in such an example, when the minimum speed ratio value is reached, the transmission may transition from the second drive range to the first drive range or from the first drive range to the reverse drive range. Returning to the example, depicted in FIG. 15, when transitioning from the first drive range to the second drive range, the first forward drive clutch may be synchronized with the second forward drive clutch. Synchronization of the clutches may include decreasing the torque transfer through the first forward clutch while correspondingly increasing torque transfer through the second forward clutch to maintain a desired transmission output torque.

FIG. 16 shows prophetic use-case plots 1600, 1602 of clutch differential speeds vs. time. Thus, the clutch differential speed is on the ordinate and time is on the abscissa. Plot 1600 specifically corresponds to the differential speed with regard to first forward drive clutch, and plot 1602 corresponds to the differential speed with regard to the second forward drive clutch. FIG. 16 further shows prophetic use-case plots 1604, 1606 of clutch pressures vs. time. Thus, clutch pressure is on the ordinate and time is on the abscissa. Plot 1604 specifically corresponds to the first forward drive clutch and plot 1606 corresponds to the second forward drive clutch. As shown, the differential speed of the first forward drive clutch remains at zero until t1, after which it increases. Conversely, the differential speed of the second forward drive clutch decreases until it reaches zero at t1, after which the differential speed remains zero. Correspondingly, the pressure delivered to the first forward clutch is decreased until t1, and the pressure delivered to the second forward clutch is adjusted to induce clutch engagement. For instance, the pressure delivered to the second forward drive clutch may be adjusted to move the clutch through a filling phase and into a clutch modulation phase where the clutch moves towards full engagement.

The sum of the torque transferred by each of the two clutches involved in the gear shift (e.g., the first forward drive clutch and the second forward drive clutch, in the illustrated example) allows the transmission to maintain a desired output shaft torque. In this way, transmission performance may be enhanced via a reduction in torque interruptions that occur during shifting transients in comparison to certain prior types of multi-speed transmissions.

FIG. 17 shows a prophetic use-case plot 1700 of the hydrostatic motor torque vs. time. Thus, hydrostatic motor torque is on the ordinate and time is on the abscissa. FIG. 17 further shows prophetic use-case plots 1702, 1704 of clutch pressure vs. time. Therefore, clutch pressure in on the ordinate and time is on the abscissa. Plot 1702 specifically corresponds to the pressure of the first forward clutch and plot 1704 corresponds to the pressure of the second forward clutch. As shown, in FIG. 17 the hydrostatic motor torque decreases below a null value during the transition from the first drive mode to the second drive mode. To elaborate, the hydrostatic motor torque set-point may be calculated based on the amount of torque transferred through the two clutches that are involved in the drive mode transition. Determining the hydrostatic motor torque set-point in this manner enables the second forward clutch, which is being engaged, to reach synchronization with the first forward drive clutch. Further, the hydrostatic unit may be a "slave" of the clutches during the gear shift event. In other words, during a gear shift, the hydrostatic unit may be controlled based on the engagement and disengagement of the clutches during the shift.

FIG. 18 shows the transmission system 100 operating to shift into the reverse range. To elaborate, torque of the hydraulic motor 134 in the hydrostatic assembly 130, reverse clutch 170, first forward drive clutch 172, and the output shaft 171 are indicated by arrows 1800, 1802, 1804, 1806, respectively. During the reverse shift operation, the hydrostatic motor torque may work in the same direction of the torques of the clutches to enable the incoming clutch (i.e., the clutch which begins to transition into a fully engaged configuration) to be synchronized. Equation (1) may therefore represent the relationship of the motor and clutch torques where a and b are mechanical gains, C1 torque is the torque of the first forward drive clutch, and C2 torque is the torque of the second forward drive clutch.

$$\text{Motor torque} = a^*(C1 \text{ torque}) + b^*(C2 \text{ torque}) \quad (1)$$

Further, the clutches may enable a desired torque to be applied to the output shaft. Equation (2) may represent the relationship between output torque and the torques of the clutches where output torque is the torque of the output shaft, c and d are mechanical gains, C1 torque is the torque of the first forward drive clutch, and C2 torque is the torque of the second forward drive clutch.

$$\text{Output torque} = c^*(C1 \text{ torque}) + d^*(C2 \text{ torque}) \quad (2)$$

Synchronizing the clutches in this manner permits torque interruptions during shifting transients to be substantially avoided, if desired. Consequently, shifting performance may be enhanced and transmission efficiency may be increased.

The technical effect of the hydromechanical transmissions and transmission operating methods described herein is to provide a targeted group of drive ranges in an energy and space efficient package. Further, the transmission systems and methods described herein allow the transmission to smoothly transition between different drive ranges with a decreased amount (e.g., substantially zero) power interruption, thereby decreasing NVH during mode shifting transients and further increasing transmission energy efficiency.

FIGS. 1-8 and 18 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system is provided that comprises a hydraulic pump and a hydraulic motor rotationally coupled in parallel with a first planetary gear set and a second planetary gear set; wherein sun gears of the first and second planetary gear sets are rotationally coupled to the hydraulic motor; and wherein a carrier of the first planetary gear set is rotationally coupled to a first clutch and a second clutch; and wherein a ring gear of the second planetary gear set is rotationally coupled to a third clutch.

In another aspect, a hydromechanical variable transmission is provided that comprises a hydraulic pump and a hydraulic motor rotationally coupled in parallel with a first planetary gear set and a second planetary gear set; wherein sun gears of the first and second planetary gear sets are rotationally coupled to the hydraulic motor; wherein a carrier of the first planetary gear set is rotationally coupled to a first forward clutch and a reverse clutch; and wherein a ring gear of the second planetary gear set is rotationally coupled to a second forward clutch.

In another aspect, a power split transmission is provided that comprises a hydraulic pump and a hydraulic motor rotationally coupled in parallel with a first planetary gear set and a second planetary gear set; wherein sun gears of the first and second planetary gear sets are rotationally coupled to the hydraulic motor; wherein a carrier of the first planetary gear set is rotationally coupled to a first forward clutch and a reverse clutch; and wherein a ring gear of the second planetary gear set is rotationally coupled to a second forward clutch.

In yet another aspect, a transmission system is provided that comprises a hydrostatic assembly and a mechanical assembly coupled in parallel via a first planetary gear set and a second planetary gear set; a plurality of clutches coupled in parallel to a transmission output, comprising: a first clutch rotationally coupled to a carrier of the first planetary gear set; a second clutch rotationally coupled to the carrier in parallel with the first clutch; and a third clutch rotationally coupled to a ring gear of the second planetary gear set; a controller including instructions stored in non-transitory memory that when executed by a processor, responsive to receiving a speed or a torque change request, cause the controller to: operate the first, second, and/or third clutches to transition between two drive ranges in a group of drive ranges, wherein the group of drive ranges includes at least one reverse drive range and two forward drive ranges.

In another aspect, a method for operation of a transmission system, that comprises transitioning between an engaged state and a disengaged state of one or more of a reverse clutch, a first forward clutch, and a second forward clutch when switching between two drive modes in a group of drive modes; wherein the first forward clutch is coupled to a carrier of a first planetary gear set, the reverse clutch is coupled to the carrier in parallel with the first forward clutch, and the second forward clutch is coupled to the ring gear of the second planetary gear set; and wherein a hydrostatic assembly, a first mechanical branch, and a second mechanical branch are couple in parallel to the first planetary gear set and the second planetary gear set. The method may further include, in one example, operating the transmission system in one of the drive modes and, while operating in the one of the drive modes, delivering power from the first planetary gear set or the second planetary gear set to a mechanical assembly of the transmission system, wherein the mechanical assembly is arranged parallel to the hydrostatic assembly.

In yet another aspect, a hydromechanical variable transmission is provided that comprises a hydrostatic assembly and a mechanical assembly coupled in parallel via a first planetary gear set and a second planetary gear set; a plurality of clutches coupled in parallel to a transmission output, comprising: a first clutch coupled to a carrier of the first planetary gear set; a second clutch coupled to the carrier in parallel with the first clutch; and a third clutch coupled to a ring gear of the second planetary gear set; and a controller including instructions stored in non-transitory memory executable by a processor, that during a shifting transient, cause the controller to: operate the first, second, and/or third clutches to transition between two drive ranges in a group of drive ranges; wherein the group of drive ranges includes at least one reverse drive range and two forward drive ranges.

In any of the aspects or combinations of the aspects, the second clutch may be a reverse clutch.

In any of the aspects or combinations of the aspects, the first clutch and the reverse clutch may be each directly coupled to the carrier and are adjacent to one another.

In any of the aspects or combinations of the aspects, the first, second, and third clutches may be friction clutches.

In any of the aspects or combinations of the aspects, the transmission system may further comprise a mechanical power take-off (PTO) rotationally coupled to a mechanical branch that extends between a power source and the hydraulic pump.

In any of the aspects or combinations of the aspects, the transmission system may further comprise a mechanical power take-off (PTO) coupled to the hydraulic pump.

In any of the aspects or combinations of the aspects, the hydraulic motor may be a fixed bent axis motor.

In any of the aspects or combinations of the aspects, the hydraulic pump may be an axial piston pump.

In any of the aspects or combinations of the aspects, the first and second planetary gear sets may be coaxially arranged.

In any of the aspects or combinations of the aspects, the first and second clutches may be axially offset from the third clutch.

In any of the aspects or combinations of the aspects, the transmission system may be included in an off-highway vehicle.

In any of the aspects or combinations of the aspects, the transmission system may further include an input interface that is configured to rotationally couple to a motive power source and an output interface that is configured to rotationally couple to one or more vehicle axles and wherein the input interface is axially offset from the output interface.

In any of the aspects or combinations of the aspects, the hydromechanical variable transmission may be an infinitely variable transmission.

In any of the aspects or combinations of the aspects, the hydromechanical variable transmission may include a mechanical power take-off (PTO) coupled to an input shaft that receives rotational input from a motive power source.

In any of the aspects or combinations of the aspects, the first forward clutch and the reverse clutch may be coaxially arranged to one another and axially offset from the second forward clutch and the first and second planetary gear sets.

In any of the aspects or combinations of the aspects, the hydraulic motor may be a fixed bent axis motor and wherein the hydraulic pump is a variable displacement axial piston pump.

In any of the aspects or combinations of the aspects, the first forward clutch, the reverse clutch, and the second forward clutch may be coupled in parallel with one another.

In any of the aspects or combinations of the aspects, the first forward clutch and the reverse clutch may be coupled to a first central shaft that is radially offset from a second central shaft that is coupled to the second forward clutch.

In any of the aspects or combinations of the aspects, the transmission system may further comprise instructions stored in the non-transitory memory that when executed by the processor, while the transmission system is operating in the reverse drive range or one of the two forward drive ranges, cause the controller to: operate the hydrostatic assembly and the mechanical assembly to additively deliver power to the first planetary gear set or the second planetary gear set.

In any of the aspects or combinations of the aspects, the transmission system may further comprise instructions stored in the non-transitory memory that when executed by the processor, while the transmission system is operating in the reverse drive range or one of the two forward drive ranges, cause the controller to: operate the hydrostatic assembly to circulate power from the first planetary gear set or the second planetary gear set back to the mechanical assembly.

In any of the aspects or combinations of the aspects, operating the first, second, and third clutches to shift between the two drive ranges may include opening the second clutch and closing the third clutch when a ring gear in the second planetary gear set allows synchronization of the third clutch.

In any of the aspects or combinations of the aspects, the second clutch may be a reverse drive clutch and the first clutch and the third clutch are forward drive clutches.

In any of the aspects or combinations of the aspects, the first, the second, and the third clutches may be friction clutches.

In any of the aspects or combinations of the aspects, the transition between the two drive ranges may be synchronously implemented.

In any of the aspects or combinations of the aspects, the group of drive ranges may include only the reverse drive range and the two forward drive ranges.

In any of the aspects or combinations of the aspects, transitioning between the engaged state and the disengaged state of one or more of the reverse clutch, the first forward clutch, and the second forward clutch may include opening the first forward clutch and closing the second forward clutch when a ring gear in the second planetary gear set allows synchronization of the second forward clutch.

In any of the aspects or combinations of the aspects, transitioning between the two drive modes may be initiated in response to a torque adjustment request and wherein the group of drive modes includes a reverse drive range, a first forward drive range, and a second forward drive range.

In any of the aspects or combinations of the aspects, operating the transmission system in one of the drive modes may include, in a portion of a drive range, operating the hydrostatic assembly to deliver power to the first planetary gear set or the second planetary gear set which is additively combined with one of the first and second mechanical branches.

In any of the aspects or combinations of the aspects, operating the transmission system in one of the drive modes may include transferring power through only one of the reverse clutch, the first forward clutch, and the second forward clutch.

In any of the aspects or combinations of the aspects, operating the first, the second, and/or the third clutches to transition between the two drive ranges may include synchronously opening one of the first, second, and third clutches while closing another one of the first, second, and third clutches.

In any of the aspects or combinations of the aspects, openings one of the first, second, and third clutches and closing another one of the first, second, and third clutches may be implemented when a ring gear in the second planetary gear set allows synchronization of the clutches that are synchronously opened and closed.

In any of the aspects or combinations of the aspects, hydromechanical variable transmission may further comprise instructions stored in the non-transitory memory that when executed by the processor, while the hydromechanical variable transmission is operating in a first portion of the reverse drive range or one of the two forward drive ranges, cause the controller to: operate the hydrostatic assembly to deliver power from the first or the second planetary gear set to the mechanical assembly; and instructions stored in the non-transitory memory that when executed by the processor, while the hydromechanical variable transmission is operating in a second portion of the reverse drive range or one of the two forward drive ranges, cause the controller to: operate the hydrostatic assembly and the mechanical assembly to additively deliver power to the first or the second planetary gear set.

In any of the aspects or combinations of the aspects, in a portion of each of the reverse drive range and the two forward drive ranges power flow may be circulated from one of the first and the second planetary gear sets to the hydrostatic assembly and from the hydrostatic assembly to an input of the mechanical assembly.

In any of the aspects or combinations of the aspects, in a portion of each of the reverse drive range and the two forward drive ranges power flow from the hydrostatic assembly and the mechanical assembly may be additively combined through one of the first and the second planetary gear sets.

In any of the aspects or combinations of the aspects, the mechanical PTO may be coupled to an input interface that receives rotational input from a motive power source (e.g., prime mover).

In any of the aspects or combinations of the aspects, the group of drive ranges may include at least one reverse drive range and two forward drive ranges.

In another representation, an off-highway vehicle with a hydrostatic-mechanical variable transmission is provided that includes synchronous forward and reverse clutches rotationally coupled in parallel to one another and rotationally coupled in series with a mechanical branch and a hydrostatic branch. Further, in the transmission, the hydrostatic branch and the mechanical branch are rotationally coupled in parallel.

In another representation, a method for transitioning between operational drive ranges in a hydrostatic-mechanical variable transmission is provided. The method includes synchronously closing a forward clutch while opening a reverse clutch in a mode change transient. The transmission further includes a hydraulic branch arranged in parallel rotational attachment to a mechanical branch and both the hydraulic branch and the mechanical branch are rotationally attached to a pair of planetary gear sets that are coaxial positioned in relation to one another.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. A transmission comprising:
   a hydrostatic assembly and a mechanical assembly coupled in parallel via a first planetary gear set and a second planetary gear set;
   a plurality of clutches coupled in parallel to a transmission output and comprising:
      a first clutch coupled to the second planetary gear set; and
      a second clutch and a third clutch coupled to the first planetary gear set; and
   a controller including instructions stored in memory that when executed cause the controller to:
      operate at least a portion of the plurality of clutches to transition between two drive ranges in a group of drive ranges;
   wherein the group of drive ranges includes an unequal number of forward and reverse drive ranges; and
      wherein the first clutch is coupled to a ring gear of the first planetary gear set.

2. The transmission of claim 1, wherein the plurality of clutches are operated to transition between the two drive ranges in response to receiving a speed or a torque change request.

3. The transmission of claim 1, wherein the first clutch and the second clutch are forward clutches and wherein the third clutch is a reverse clutch.

4. The transmission of claim 3, wherein the first clutch, the second clutch, and the third clutch are friction clutches.

5. The transmission of claim 1, wherein the second clutch and the third clutch are coupled to a carrier in the second planetary gear set.

6. The transmission of claim 1, wherein the controller further comprises instructions stored in the memory that when executed, while the transmission is operating in one of the drive ranges in the group of drive ranges, cause the controller to:
   operate the hydrostatic assembly to circulate power from the first or the second planetary gear set back to the mechanical assembly.

7. The transmission of claim 6, wherein the controller further comprises instructions stored in the memory that when executed, while the transmission is operating in one of the drive ranges in the group of drive ranges, cause the controller to:
   operate the hydrostatic assembly to additively combine mechanical power from the hydrostatic assembly and the mechanical assembly.

8. The transmission of claim 1, wherein the second clutch and the third clutch are coaxially arranged.

9. The transmission of claim 1, wherein the controller further comprises instructions stored in the memory that when executed, while the transmission is operating in one of the drive ranges in the group of drive ranges, cause the controller to:
   operate a hydraulic pump in the hydrostatic assembly to alter a swivel angle of the hydraulic pump.

10. The transmission of claim 1, wherein the second planetary gear set is a simple planetary gear set.

11. A method for operation of a transmission, comprising:
   engaging a first clutch while disengaging a second clutch when switching between two drive modes in a group of drive modes;
   wherein the second clutch is coupled to a carrier in a first planetary gear set;
   wherein the first clutch is coupled to a ring gear in a second planetary gear set; and
   wherein a hydrostatic assembly is coupled in parallel to the first planetary gear set and the second planetary gear set.

12. The method of claim 11, further comprising adjusting a swivel angle of a hydraulic pump in the hydrostatic assembly while the transmission is operating in one of the drive modes in the group of drive modes.

13. The method of claim 11, wherein the first clutch and the second clutch are friction clutches.

14. The method of claim 11, wherein the first clutch and the second clutch are forward clutches.

15. A hydromechanical variable transmission, comprising:
   a hydrostatic assembly and a mechanical assembly coupled in parallel via a first planetary gear set and a second planetary gear set;
   a plurality of clutches coupled in parallel to a transmission output, comprising:
      a first forward clutch coupled to a carrier of the first planetary gear set;
      a reverse clutch coupled to the carrier in parallel with the first forward clutch; and
      a second forward clutch coupled to a ring gear of the second planetary gear set; and
   a controller including instructions stored in memory that when executed, during a shifting transient, cause the controller to:
      operate the first forward clutch, the second forward clutch, and/or the reverse clutch to transition between two drive ranges in a group of drive ranges.

16. The hydromechanical variable transmission of claim 15, wherein the group of drive ranges includes a greater number of forward ranges than reverse ranges.

17. The hydromechanical variable transmission of claim 15, wherein the first forward clutch, the second forward clutch, and the reverse clutch are friction clutches.

18. The hydromechanical variable transmission of claim 15, wherein the controller further comprises instructions stored in the memory that when executed, during operation of the hydromechanical variable transmission in one of the drive ranges in the group of drive ranges, cause the controller to:

adjust a swivel angle of a hydraulic pump in the hydrostatic assembly.

19. The hydromechanical variable transmission of claim 15, wherein operating the first forward clutch, the second forward clutch, and/or the reverse clutch to transition between two drive ranges in the group of drive ranges includes synchronizing two of the plurality of clutches.

* * * * *